United States Patent
Saint-Pierre et al.

[11] Patent Number: 6,151,231
[45] Date of Patent: Nov. 21, 2000

[54] CIRCUIT AND METHOD FOR REACTIVE ENERGY RECIRCULATION CONTROL IN A SERIES-RESONANT CONVERTER

[75] Inventors: Roland Sylvere Saint-Pierre, Lawrenceville; Ashok R. Patil, Duluth; John Wendell Oglesbee, Watkinsville, all of Ga.

[73] Assignee: Motorola, Inc., Schaumburg, Ill.

[21] Appl. No.: 09/224,407

[22] Filed: Dec. 31, 1998

[51] Int. Cl.$^7$ .............................. H02M 3/24; H02M 3/335
[52] U.S. Cl. .................................................. 363/95; 363/17
[58] Field of Search .................. 363/95, 16, 17, 363/21, 132; 323/282, 222

[56] References Cited

U.S. PATENT DOCUMENTS

| | | | |
|---|---|---|---|
| 4,179,671 | 12/1979 | Yoshida et al. | 331/116 FE |
| 5,065,301 | 11/1991 | Shioya et al. | 363/17 |
| 5,388,040 | 2/1995 | Hall | 363/16 |

*Primary Examiner*—Peter S. Wong
*Assistant Examiner*—Rajnikant B. Patel
*Attorney, Agent, or Firm*—Felipe J. Farley; Philip H. Burrus, IV

[57] ABSTRACT

A series-resonant power converter (10) featuring a tap winding (106) on a transformer (100) that is coupled to a resonant capacitor (124) in a resonant tank circuit (122). An output voltage is taken at a secondary (104) of the transformer (100) via a rectifier (110). A control circuit (140) is coupled to the output voltage to monitor the output voltage with respect to a reference to determine load conditions and to generate a control signal representative thereof. An energy recirculation circuit (180) is coupled to the control circuit (140) and to the voltage source (12) and comprises a switch (186) coupled to the tap winding (106) of the transformer (100). The switch (186) is responsive to the control signal to clamp the voltage across the resonant capacitor (124) when the control circuit (140) detects light load conditions to couple energy extracted from the resonant tank circuit (124) via the tap winding (106) to the voltage source (12), and otherwise to maintain the voltage across the resonant capacitor (124) unaffected when the control circuit (140) determines heavy load conditions.

2 Claims, 9 Drawing Sheets

STAGE I
RESONANT CAPACITOR DISCHARGING

STAGE II
ENERGY RE-CIRCULATION

CIRCUIT AND METHOD FOR REACTIVE ENERGY RECIRCULATION CONTROL IN A SERIES-RESONANT CONVERTER

RELATED APPLICATION

This application is related to commonly assigned U.S. Application No. 09/224,416 filed on even date, Docket No. EN 10741, and entitled "Parallel-Loaded Series Resonant Converter Having A Piezo-Electric Crystal As Self-Oscillating Element," the entirety of which is incorporated herein by reference.

FIELD OF THE INVENTION

The present invention is directed to power supply devices for portable electronic devices, such as laptop and desktop computers, and more specifically to a circuit and method for controlling a series-resonant converter.

BACKGROUND OF THE INVENTION

Power converters are used to convert alternating current (AC) power to suitable direct current (DC) levels for powering an apparatus, such as laptop computers and other appliances. It is necessary to control the output voltage and/or current of a power converter, particularly under variable load conditions.

Prior art techniques for controlling series-resonant converters include variable frequency control, phase-control and fixed frequency pulse width modulation (PWM) duty-cycle control. These control methods directly affect the operating state or mode of the resonant tank in the power converter by altering the operating frequency or conduction intervals of the switching elements. Consequently, the resonant tank current and voltage phase angle relationships are altered in order to realize closed-loop output control.

A significant disadvantage of these control methods is that they achieve regulation at the expense of losses caused by the switching regime. What is needed is a control circuit and method that allows the converter to maintain a constant switching frequency and nearly load independent resonant tank characteristics across an entire load variation range.

DETAILED DESCRIPTION OF A PREFERRED EMBODIMENT

Figure 1:
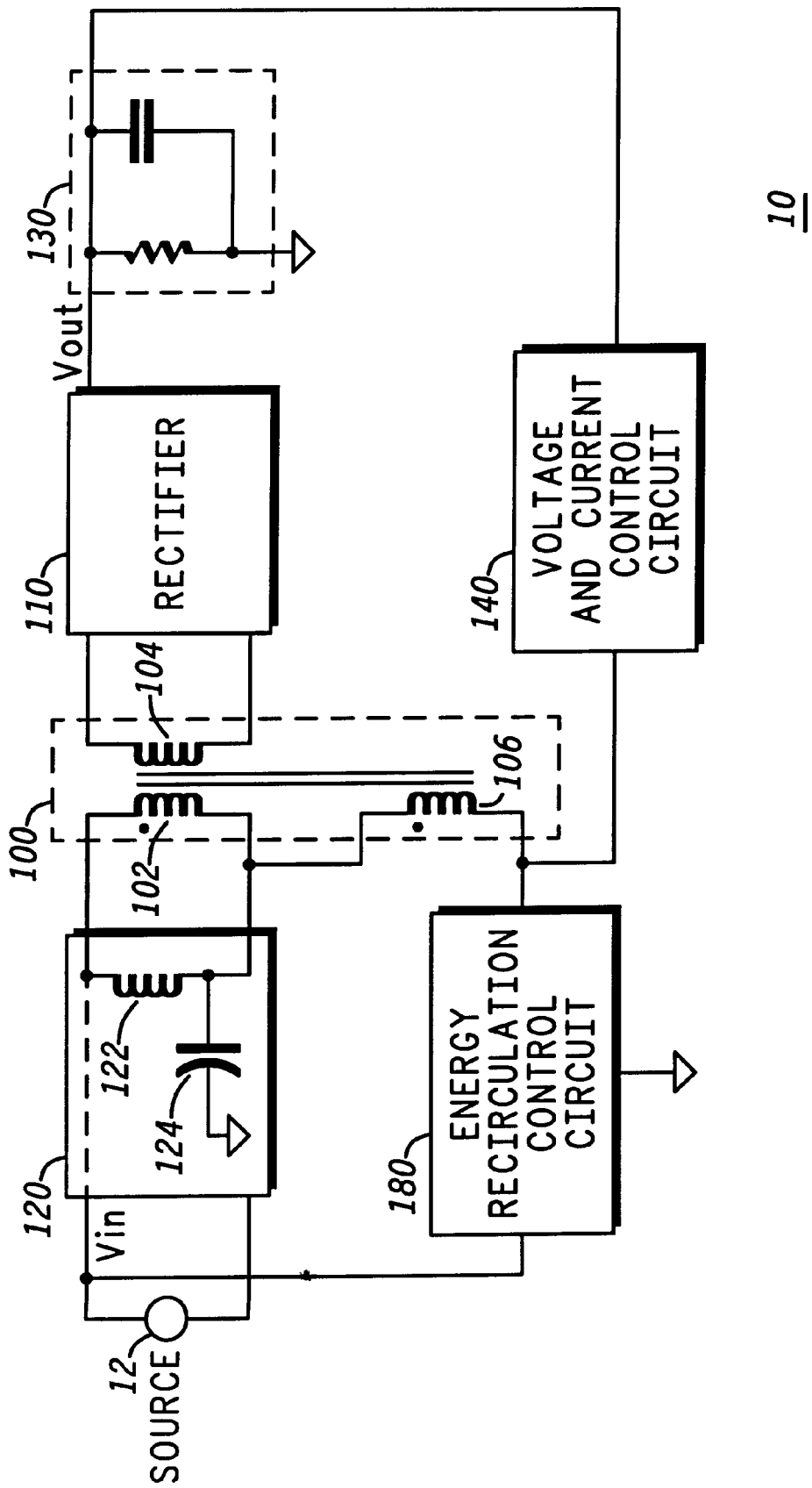
FIG. 1 is a general block diagram of a series-resonant converter featuring voltage and current control and energy recirculation circuits according to the present invention.

Referring first to FIG. 1, a series-resonant converter is shown generally at reference numeral 10. The function of the series-resonant converter is to convert an input voltage $V_{IN}$ derived from a source 12 to an output voltage $V_{OUT}$. The series-resonant converter 10 comprises a transformer 100 having a primary winding 102 and a secondary winding 104. An additional tap winding 106 is provided for use as described hereinafter. The tap winding 106 is coupled to the resonant capacitor 124. A rectifier 110 is coupled to the secondary winding to couple an output voltage to a load 130.

A resonant tank circuit 120 is coupled to the primary winding 102. The resonant tank circuit comprises a resonant element 122, such as a coil inductor, and a resonant capacitor 124. Inductors suitable for the resonant element 122 are well known in the art. Alternatively, the resonant element comprises a piezo-electric crystal resonant element as described in the aforementioned co-pending application. The resonant capacitor 124 is connected in series with the resonant element 122 and ground, hence the resonant tank circuit 120 is a "series-resonant" tank circuit. The tap winding 106 is connected such that its "dotted" terminal is connected to the node between the resonant inductor 122 and the resonant capacitor 124, thereby tapping the voltage across the resonant capacitor 124.

The control circuit and method of the present invention has utility with a series-resonant converter described in the aforementioned co-pending application, as well as with any type of series-resonant power converter. As is well known in the art, a series-resonant power converter converts an input voltage, typically from an AC source, to an output voltage, typically a DC voltage.

According to the present invention, two additional circuits are provided in order to control the series-resonant converter. A voltage and current control circuit 140 (hereinafter also referred to as the "control circuit") is provided that is coupled to the output voltage $V_{OUT}$. An energy recirculation circuit 180 is also provided that is coupled to the tap winding 106 on the transformer 100. The voltage and current control circuit 140 compares the output voltage with a reference voltage to determine load conditions within a predetermined regulation level set by the reference voltage and generates control information that is transmitted to the energy recirculation circuit 180. In response to the control information, the energy recirculation circuit 180 controls how much energy from the resonant tank circuit is permitted to flow either to back to the source 12 or to ground during oscillations between a positive and negative maximum voltage. In so doing, the energy recirculation circuit 180 clamps (or "clips") the voltage across the resonant capacitor 124.

Figure 2:
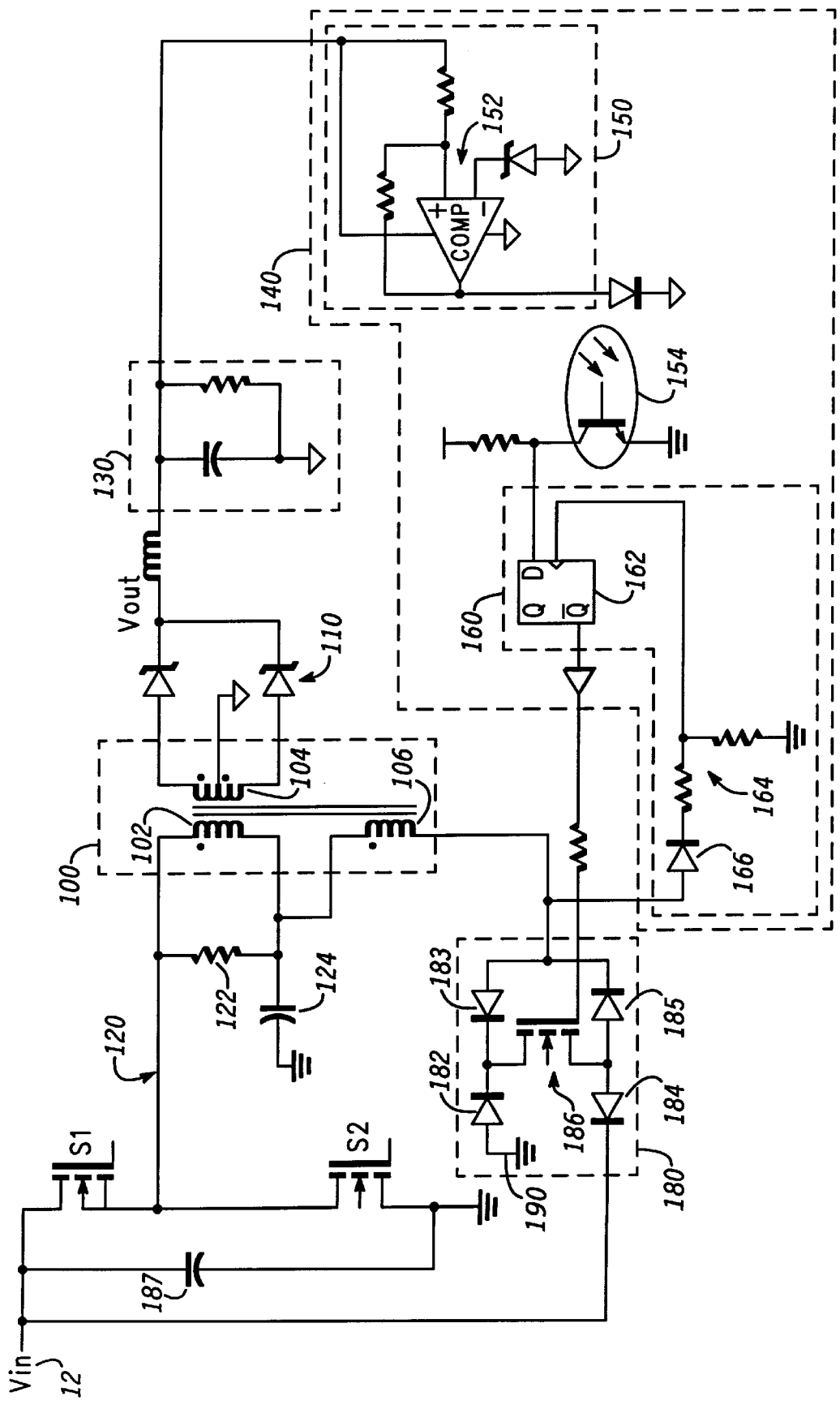
FIG. 2 is a schematic diagram of a series-resonant converter comprising a voltage and current control circuit according to a first embodiment of the present invention.
Figure 3:
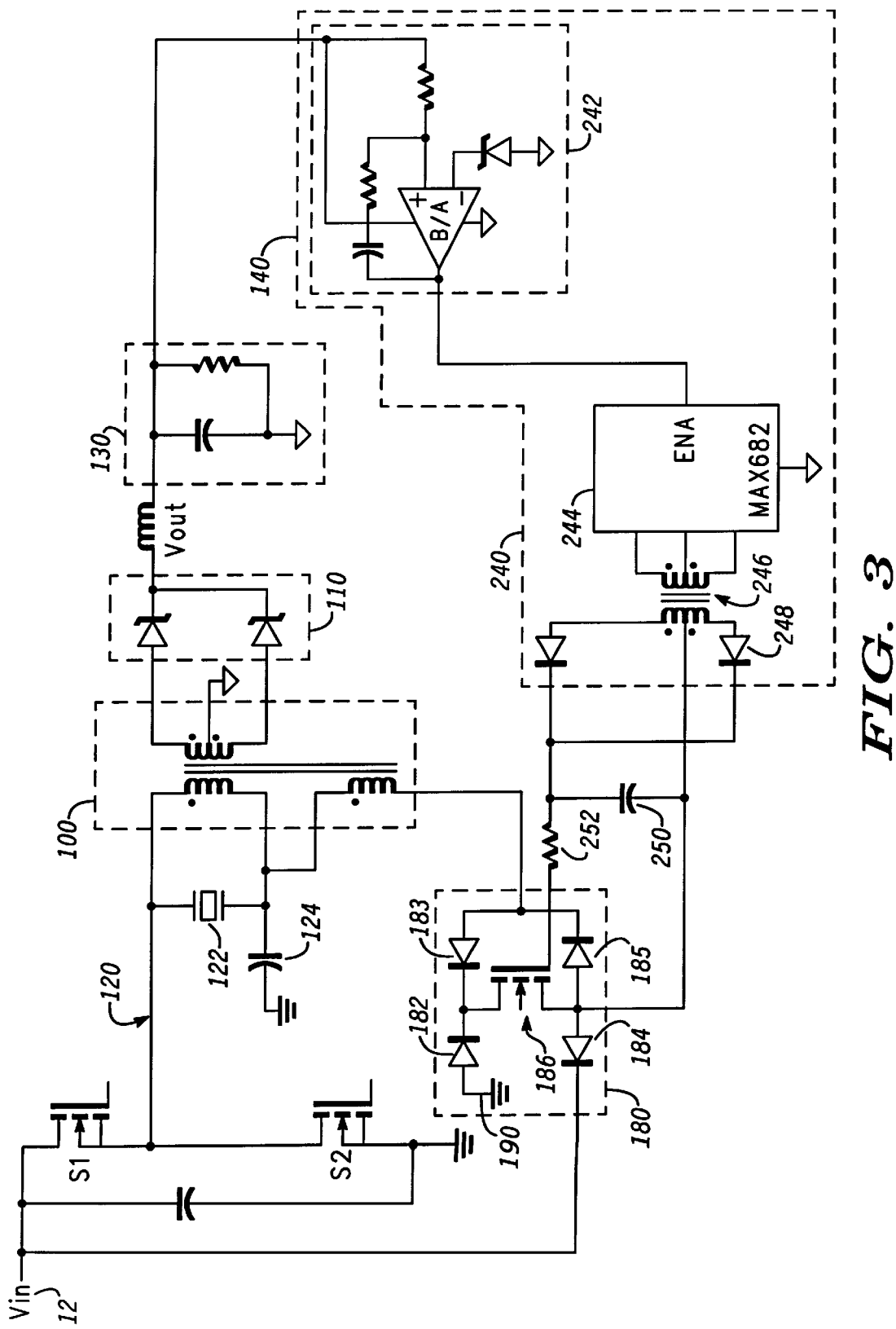
FIG. 3 is a schematic diagram of a series-resonant converter comprising a voltage and current control circuit according to a second embodiment of the present invention.

FIGS. 2 and 3 illustrates voltage and current control circuits according to first and second embodiments, respectively, of the present invention. The energy recirculation circuit 180 is the same in each figure. In FIGS. 2 and 3, only those components of the series-resonant converter 10 are shown which are necessary for purposes of understanding the invention. As mentioned above, the present invention has utility with a series-resonant converter featuring a self-oscillating resonant tank circuit as disclosed in the commonly 5 assigned co-pending application entitled "Parallel-Loaded Series Resonant Converter Having A Piezo-Electric Crystal As Self-Oscillating Element," as well as with other series-resonant converters. The switches S1 and S2 shown in FIGS. 2 and 3 are part of the series-resonant converter architecture disclosed in that related application, but need not be described here for purposes of understanding the present invention.

Turning to FIG. 2, the voltage and current control circuit 140 comprises a hysteretic voltage controller 150 featuring a comparator 152 that compares the output voltage $V_{OUT}$ to a reference voltage and generates an enable signal or a disable signal at its output when the output voltage is greater than the reference voltage. The reference voltage sets the regulation level of the voltage and current control circuit 140, as will become more apparent hereinafter. The comparator 152 is connected to an opto-coupler 154, which in turn is connected to a zero-crossing detector 160.

The zero-crossing detector 160 comprises a D flip-flop 162 having a D input coupled to the output of the opto-coupler 154 and a voltage divider network 164. The voltage divider network 164 is coupled to the tap winding 106 of the transformer 100 by a diode 166. The Q' output of the D flip flop 162 is coupled (through an appropriate amplifier and resistor) to the energy recirculation circuit 180.

The energy recirculation circuit 180 comprises a bi-directional switching network consisting of steering diodes 182, 183, 184 and 185 and a switch 186. The switch 186 is a metal oxide silicon field effect transistor (MOSFET), for example. The source and drain of switch 186 are connected as shown between diodes 182 and 183, on the one hand, and diodes 184 and 185 on the other hand. The gate of switch 186 is driven by the output of the D flip-flop in the zero-crossing detector 160. The steering diodes 182–185 allow for unidirectional current flow and voltage across the switch 186. Output power (voltage and/or current) control is achieved by controlling the conduction of the switch 186. When the switch 186 is "on" (i.e., closed) a controlled amount of energy from the resonant tank circuit 120 flows through the steering diodes 182–185 either to the source 12 or to ground shown at reference numeral 190. By extracting energy through the tap winding 106 from the resonant tank circuit 120, the voltage across the resonant capacitor 124 is clamped to a maximum or minimum voltage.

Figure 4:
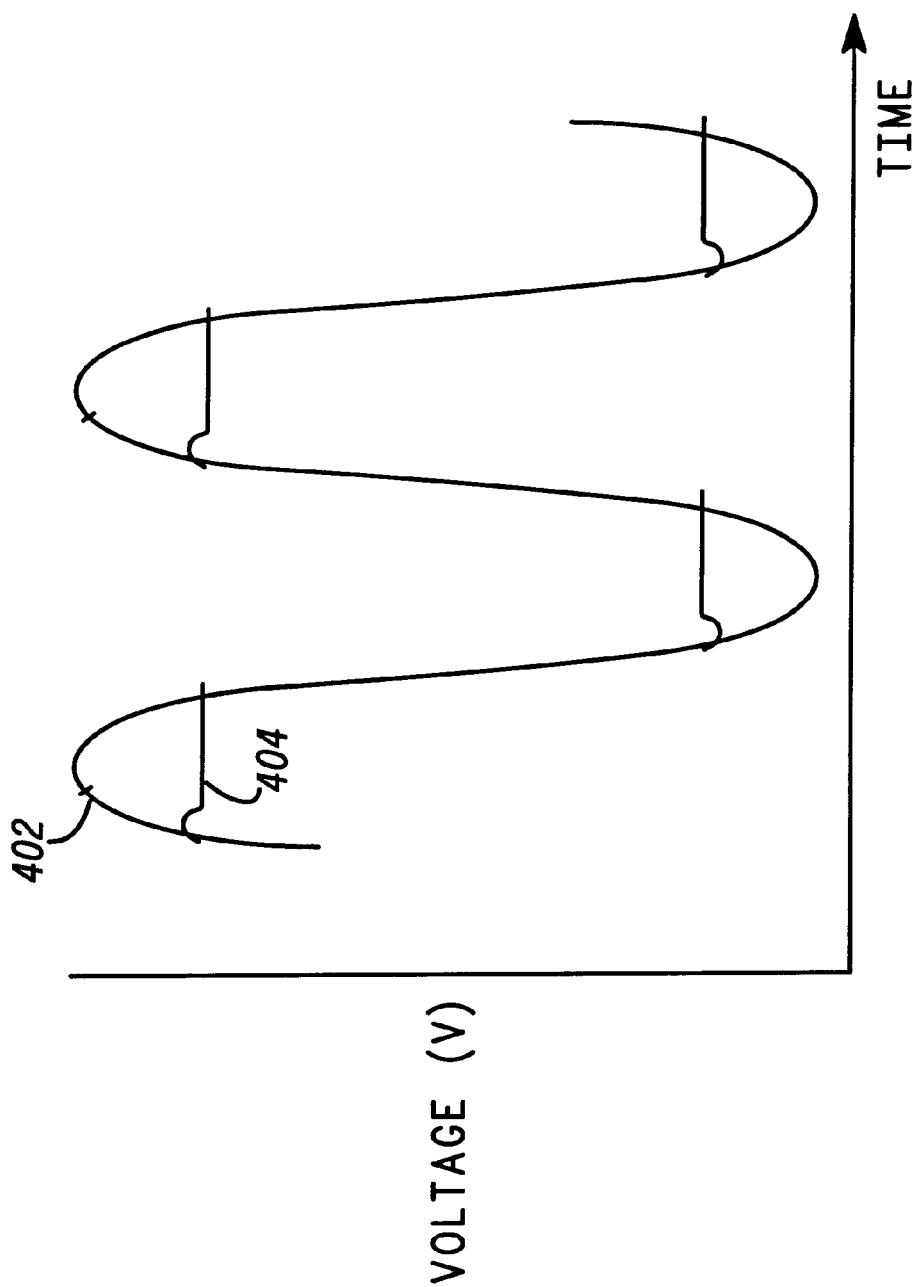
FIG. 4 is a graphical diagram showing how the voltage across the resonant capacitor is selectively clamped based on load conditions in accordance with the present invention.
Figure 5:
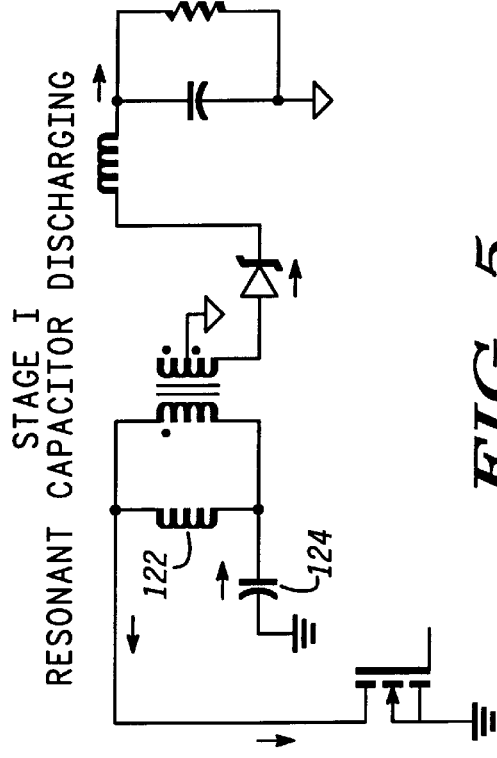
FIGS. 5–8 illustrate simplified topologies for the energy recirculation during four stages of charging/discharging of the resonant capacitor in the resonant tank circuit wherein the energy recirculation circuit employs a single bulk capacitor.
Figure 6:
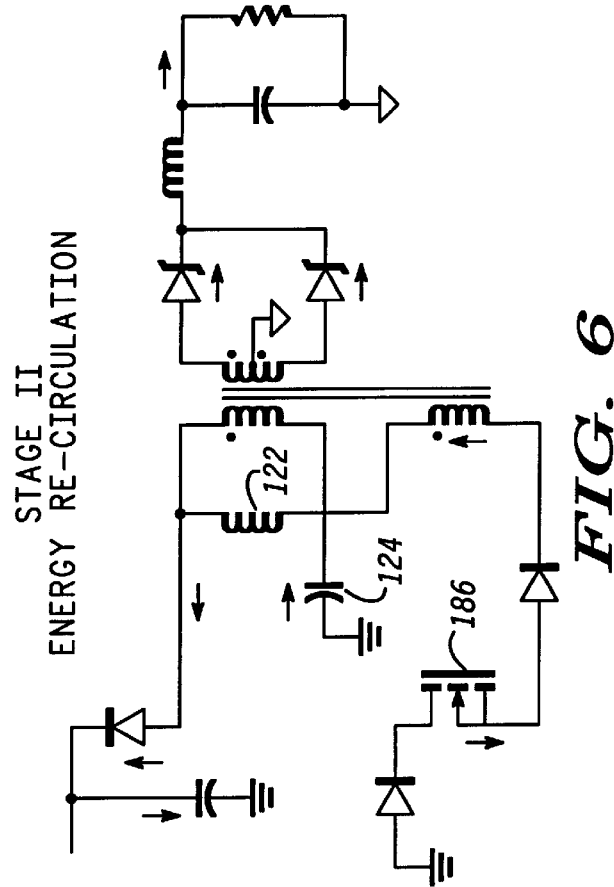
Figure 7:
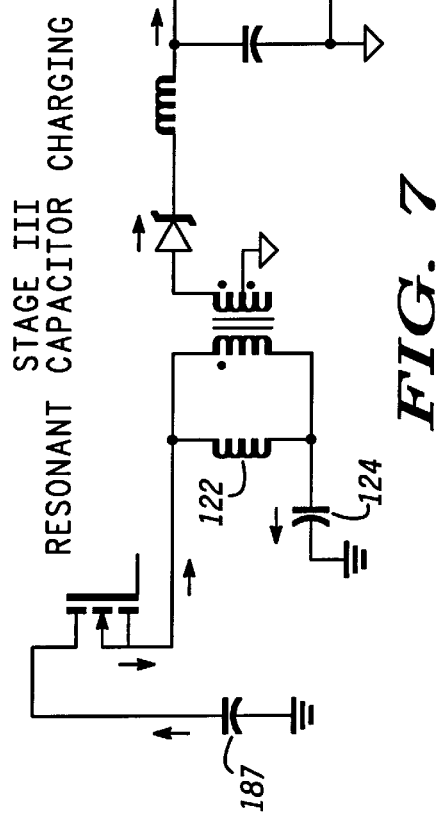
Figure 8:
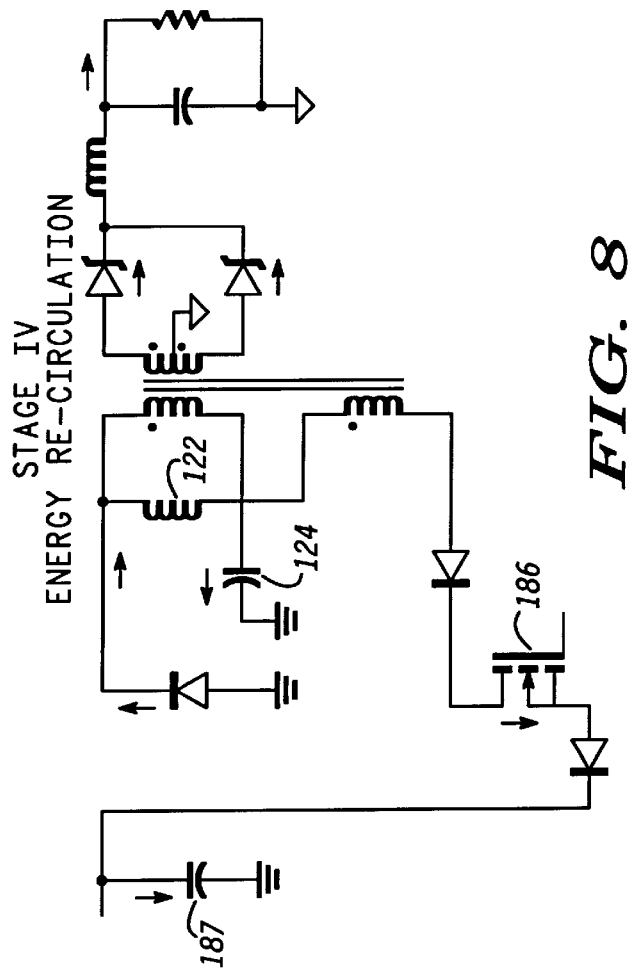

The operation of the voltage and current control circuit 140 and the energy recirculation circuit 180 as shown in FIG. 2 will now be described. The purpose of these circuits is to connect the tap winding 106 to either the input voltage $V_{IN}$ for energy recirculation to the source 12 or to ground. The effect on the resonant capacitor 124 of selectively closing the switch 186 is shown in the waveform of FIG. 4. When the switch 186 is closed, the positive and negative voltage peaks across the resonant capacitor 124 are clamped. During the flat or clamped portions of the resonant capacitor voltage waveform, energy from the resonant tank circuit 120 is extracted and transferred to the source 12 by the energy recirculation circuit 180 and tap winding 106. When the switch 186 is open, the resonant capacitor 124 resumes its normal sinusoidal waveform. Thus, by controlling the period of time that the switch 186 is closed, the level of energy stored in the resonant tank circuit 120 and the output voltage and/or current delivered from the secondary winding 110 to the load 130 is controlled.

The voltage and current control circuit 140 compares the output voltage with a reference voltage. The reference voltage is set according to a desired predetermined regulation level. When the output voltage exceeds the reference voltage, indicative of light load conditions, the comparator 152 generates an enable signal that is coupled by the optical coupler 154 to the D flip-flop 162. The D flip-flop 162, in response to the enable signal, outputs a signal via its Q' output that is coupled to the switch 186 of energy recirculation circuit 180 to activate it into its "on" state. In the "on" state, the switch 186 closes, thereby clamping the voltage across the resonant capacitor 124, and reducing the overall resonant tank energy since at both half of the cycles of operation energy is returned to the source 12 via the steering diodes 183 and 184, thereby reducing the amount of energy available at the secondary winding 104. Thus, activation of the energy recirculation circuit 180 and closing of the switch 186 tends to reduce the output voltage and/or current to the load 130. Conversely, when the output voltage and/or current to the load is below the voltage reference of the comparator 152 the voltage and current control circuit 140 will initiate a disable signal via the D flip-flop 162 to de-activate the energy recirculation circuit 180. When the energy recirculation circuit 180 is de-activated, the switch 186 is open and the resonant capacitor resumes its normal sinusoidal operation, thereby allowing the resonant tank circuit to build up energy to be available at the secondary winding 104.

Turning to FIG. 3, a voltage and current control circuit 240 according to a second embodiment will be described. The voltage and current control circuit 240 comprises an error amplifier 242 rather than a voltage comparator to derive the control information that is processed through a signal pulse transformer 246, which in turn, is driven by an isolated transformer driver integrated circuit (IC) 244.

The error amplifier 242 is coupled to the output voltage $V_{OUT}$ and is connected to a transformer driver IC 244. The integrated transformer driver IC 244 is, for example, a MAX845 IC with a fixed internal frequency and a push-pull transistor stage. The benefit of this embodiment is that the pulse transformer 246 and the transformer driver IC 244 provide both control information and gate power to the MOSFET switch 186. In addition, these circuits provide an alternate means of maintaining isolation between the primary and secondary of the transformer 100.

In operation, the error amplifier 242 generates an error signal that represents the offset (positive or negative) of the output voltage from the reference voltage. Again, the reference voltage determines the desired predetermined voltage regulation. The error signal commands the transformer driver IC 244 to start its high frequency commutation of the pulse transformer 246, for a time duration based on the magnitude and sign of the error signal. The output of the pulse transformer 246 is rectified by the diodes 247 and 248, and filtered by the capacitor 250 and resistor 252 to provide a DC signal to the gate of the MOSFET switch 186. Like the control signals generated by the voltage and current control circuit 140 in the first embodiment, the error signal generated by the error amplifier causes the MOSFET switch 186 to open or close according to load conditions represented by the amount of positive or negative deviation of the output voltage from the desired predetermined regulation level. The operation of the energy recirculation circuit 180 is otherwise identical to that described in conjunction with FIG. 2.

There is a further feature of the energy recirculation circuit 180 that will now be described. Referring back to FIG. 2, a single DC bulk capacitor 187 is provided as part of the energy recirculation circuit 180. The bulk capacitor 187 is coupled in parallel with the resonant tank circuit 120. The tap winding 106 is connected to the junction of the resonant capacitor 124 and the inductor element 122. This arrangement introduces a DC voltage offset in the resonant capacitor voltage which may be desirable for certain applications.

FIGS. 5–8 illustrate the simplified topologies of the energy recirculation circuit 180 (with the single bulk capacitor 187) during each of four stages of the charging/ discharging cycle of the resonant capacitor in the resonant tank circuit. These diagrams are similar to those in the co-pending application entitled "Parallel-Loaded Series Resonant Converter Having A Piezo-Electric Crystal As Self-Oscillating Element," but differ in that they show the flow of energy through the energy recirculation circuit 180 back to the source (assuming the switch 186 is closed) in stages II and IV.

Figure 9:
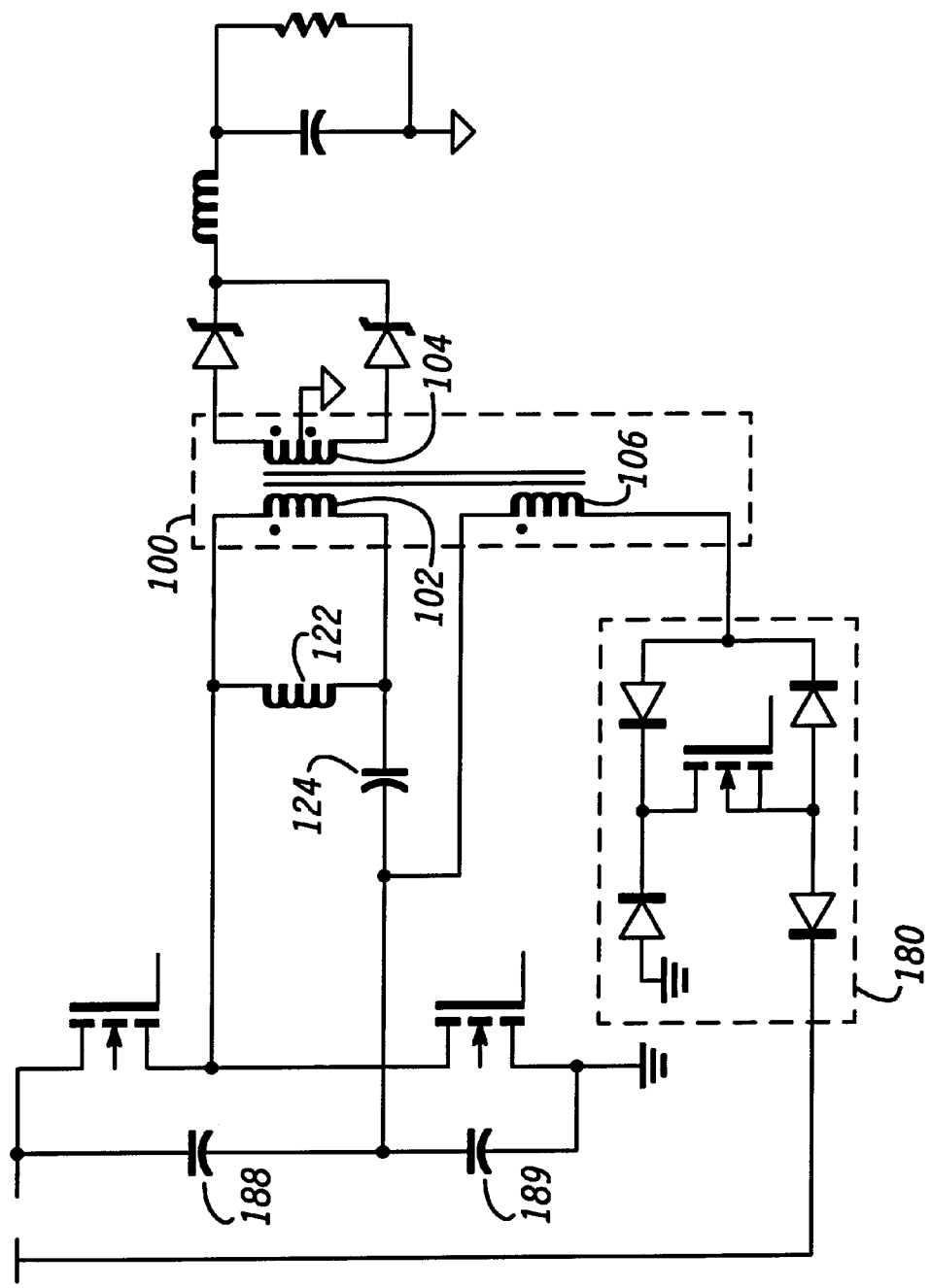
FIG. 9 is a schematic diagram showing the provision of two bulk capacitors employed by the energy recirculation circuit according to an alternative form of the energy recirculation circuit.
Figure 10:
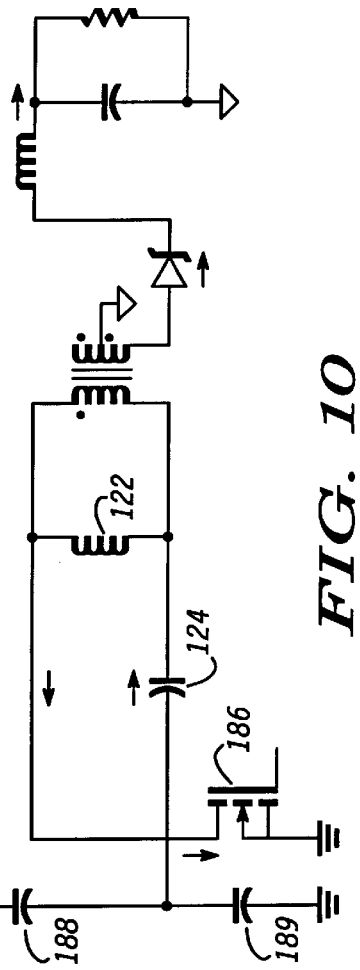
FIGS. 10–13 illustrate simplified topologies for the alternative form of the energy recirculation circuit during four stages of charging/discharging of the resonant capacitor.
Figure 11:
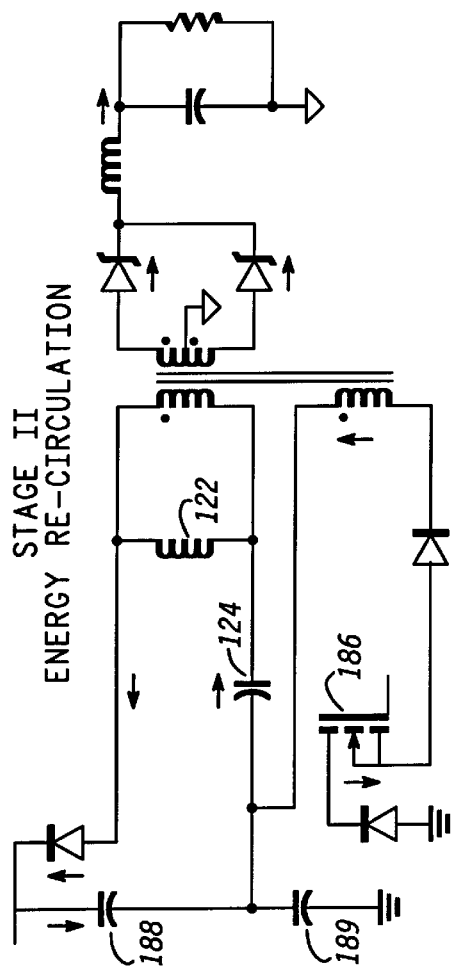
Figure 12:
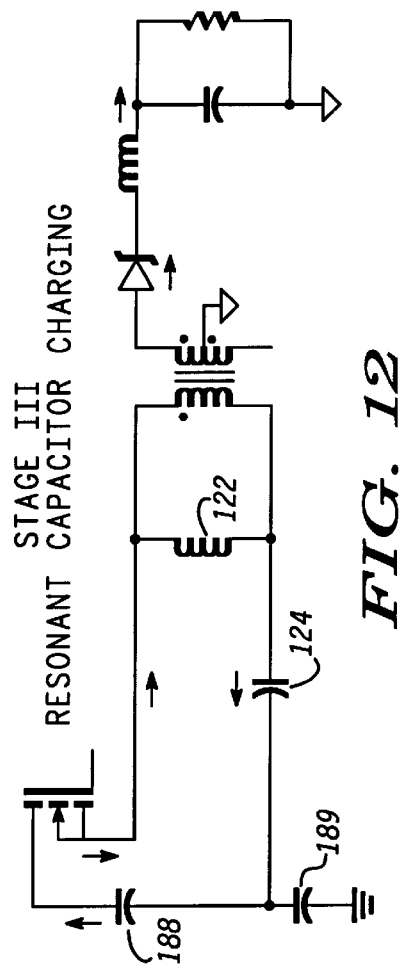
Figure 13:
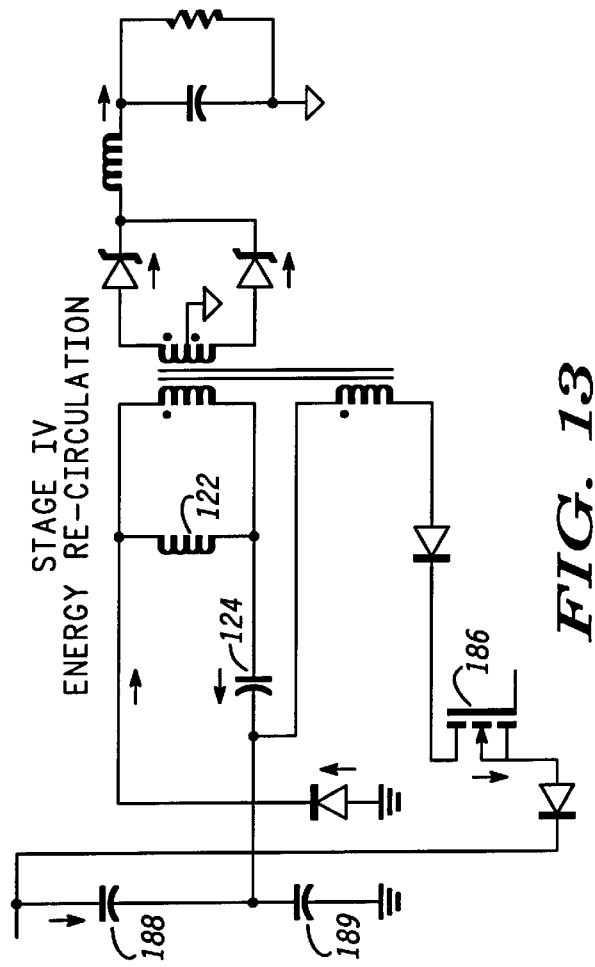

Alternatively, as shown in FIG. 9, two bulk capacitors 188 and 189 may be provided that are coupled in parallel with the resonant tank circuit 120. The resonant capacitor 124 is connected to node between the two capacitors 188 and 189. In addition, the tap winding 106 is coupled to this same node between the two capacitors 188 and 189. In this arrangement, the voltage across the resonant capacitor 124 is symmetric about ground and has no DC offset.

FIGS. 10–13 illustrate the simplified topologies of the energy recirculation circuit 180 during each of four stages of the charging/discharging cycle of the resonant capacitor in the resonant tank circuit 120, similar to FIGS. 5–8. Recirculation occurs during stages II and IV through the switch 186 and the bulk capacitors 188 and 189.

The bulk capacitors referred to above are substantially larger in magnitude than the resonant capacitor in the resonant tank circuit. Therefore, the bulk capacitors will not contribute to the overall impedance of the resonant tank circuit.

In summary, the present invention is directed to a series-resonant power converter comprising: a transformer having a primary winding, a tap winding, and a secondary winding, the primary winding and the tap winding carrying current flow in the same direction; a resonant tank circuit connected in parallel with the primary winding, the resonant tank circuit comprising a resonant element connected in parallel with the primary winding of the transformer and a resonant capacitor connected in series with the resonant element, the resonant capacitor of the resonant tank circuit being connected to the tap winding; a voltage source coupled to the resonant tank circuit; a rectifier coupled to the secondary winding and generating an output voltage for use by a load; a control circuit coupled to the output voltage that monitors the output voltage with respect to a reference to determine load conditions and generates a control signal representative thereof; and an energy recirculation circuit coupled to the control circuit and to the voltage source, the energy recirculation circuit comprising a switch coupled to the tap winding of the transformer, the switch being responsive to the control signal to clamp the voltage across the resonant capacitor during oscillations of the resonant tank circuit when the control circuit detects light load conditions to couple energy extracted from the resonant tank circuit via the tap winding to the voltage source, and the switch being responsive to the control signal to maintain the voltage across the resonant capacitor unaffected when the control circuit determines heavy load conditions.

Furthermore, the present invention is directed to a method for controlling the output voltage and/or current of a series-resonant converter comprising steps of: sensing an output voltage of the series-resonant converter that is supplied to a load; comparing the output voltage with a reference to determine load conditions; and clamping the voltage across a resonant capacitor in a resonant tank circuit of the series-resonant converter during light load conditions thereby extracting energy from the resonant tank circuit and recirculating it to the source and otherwise maintaining voltage across the resonant capacitor unclamped so that energy stays in the resonant tank circuit for conversion and use by a load under heavy load conditions.

The step of clamping is responsive to the step of comparing determining that the output voltage is greater than the reference indicative of light load conditions so as to clamp the voltage across the resonant capacitor and recirculating energy in the resonant tank circuit to the source, and is further responsive to the step of comparing determining that the output voltage is less than a reference indicative of heavy load conditions so as to maintain the energy in the resonant tank circuit for conversion and use by the load.

The voltage across the resonant capacitor is a sinusoidal waveform and the peaks (positive maximum and negative maximum) are clamped during cycles of the oscillations for a period of time during which it is determined that the output voltage is greater than the reference.

Similarly, the present invention involves a method for controlling the output voltage and/or current of a series-resonant converter comprising steps of: sensing load conditions of a load which is driven by the series-resonant converter; and extracting energy from a resonant tank circuit of the series-resonant converter and recirculating energy from the resonant tank circuit to a source when load conditions are determined to be light, and otherwise not extracting energy from the resonant tank circuit when load conditions are determined not to be light.

The control circuit and method described herein allows the converter to maintain a constant switching frequency and nearly load independent tank resonant tank characteristics. In addition, the control circuit and method will not affect any zero-voltage switching characteristics of the converter across an entire load range.

The above description is intended by way of example only and is not intended to is limit the present invention in any way except as set forth in the following claims.

What is claimed is:

1. A series-resonant power converter comprising:

a transformer having a primary winding, a tap winding, and a secondary winding, the primary winding and the tap winding carrying current flow in the same directions;

a resonant tank circuit connected in parallel with the primary winding, the resonant tank circuit comprising a resonant element and a resonant capacitor connected in series with the resonant element, the resonant capacitor of the resonant tank circuit being connected to the tap winding;

a voltage source coupled to the resonant tank circuit;

a rectifier coupled to the secondary winding and generating an output voltage for use by a load;

a control circuit coupled to the output voltage that monitors the output voltage with respect to a reference to determine load conditions and generates a control signal representative thereof; and an energy recirculation circuit coupled to the control circuit and to the voltage source, the energy recirculation circuit comprising a switch coupled to the tap winding of the transformer, the switch being responsive to the control signal to clamp the voltage across the resonant capacitor during oscillations of the resonant tank circuit when the control circuit detects light load conditions to couple energy extracted from the resonant tank circuit via the tap winding to the voltage source, and the switch being responsive to the control signal to maintain the voltage across the resonant capacitor unaffected when the control circuit determines heavy load conditions;

wherein the energy recirculation circuit further comprises a bulk capacitor coupled in parallel with the resonant tank circuit, and wherein the resonant capacitor is connected in series between the resonant element and ground, the tap winding being connected to a node between the resonant capacitor and the resonant element, whereby the bulk capacitor induces a DC offset in a voltage waveform of the resonant capacitor.

2. A series-resonant power converter comprising:

a transformer having a primary winding, a tap winding, and a secondary winding, the primary winding and the tap winding carrying current flow in the same directions;

a resonant tank circuit connected in parallel with the primary winding, the resonant tank circuit comprising a resonant element and a resonant capacitor connected in series with the resonant element, the resonant capacitor of the resonant tank circuit being connected to the tap winding;

a voltage source coupled to the resonant tank circuit;

a rectifier coupled to the secondary winding and generating an output voltage for use by a load;

a control circuit coupled to the output voltage that monitors the output voltage with respect to a reference to determine load conditions and generates a control signal representative thereof; and an energy recirculation circuit coupled to the control circuit and to the voltage source, the energy recirculation circuit comprising a switch coupled to the tap winding of the transformer, the switch being responsive to the control signal to clamp the voltage across the resonant capacitor during oscillations of the resonant tank circuit when the control circuit detects light load conditions to couple energy extracted from the resonant tank circuit via the tap winding to the voltage source, and the switch being responsive to the control signal to maintain the voltage across the resonant capacitor unaffected when the control circuit determines heavy load conditions;

wherein the energy recirculation circuit further comprises first and second bulk capacitors coupled in parallel with the resonant tank circuit, and wherein the resonant capacitor is connected in series with the resonant element and a node between the first and second bulk capacitors, the tap winding of the transformer being connected to the node between the first and second bulk capacitors, whereby a voltage waveform across the resonant capacitor is symmetric with respect to ground.

* * * * *